April 27, 1965
R. J. MOFFAT
3,180,402
TEMPERATURE-COMPENSATED REGENERATOR SEAL
Filed March 21, 1961
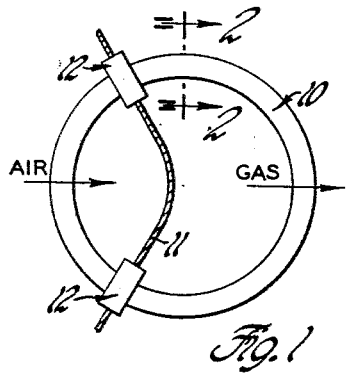
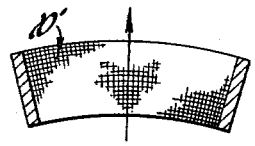
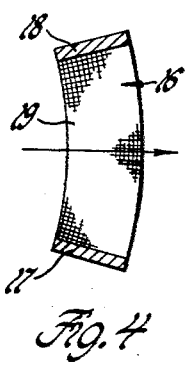
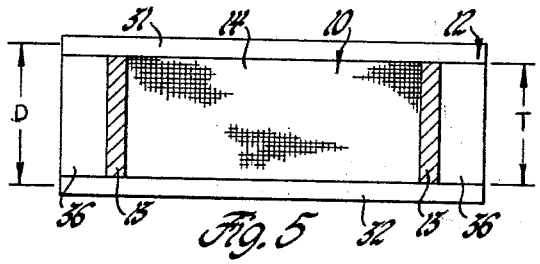
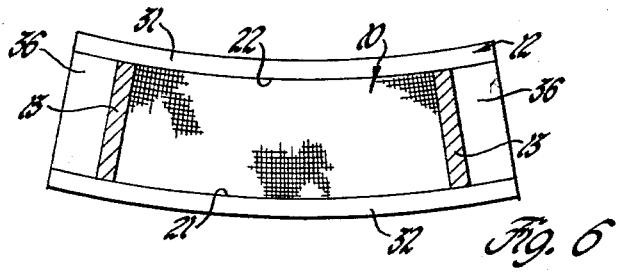
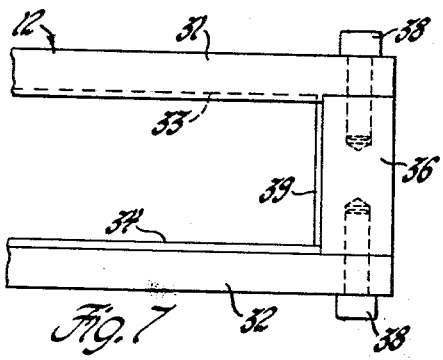
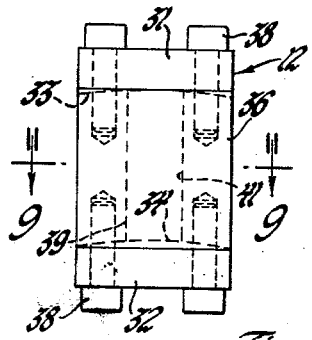
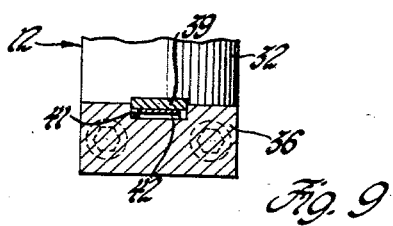
INVENTOR.
Robert J. Moffat
BY
Paul Fitzpatrick
ATTORNEY

United States Patent Office 3,180,402
Patented Apr. 27, 1965

3,180,402
TEMPERATURE-COMPENSATED
REGENERATOR SEAL
Robert J. Moffat, Oak Park, Mich., assignor to General Motors Corporation, Detroit, Mich., a corporation of Delaware
Filed Mar. 21, 1961, Ser. No. 97,233
2 Claims. (Cl. 165—9)

My invention is directed to improvements in rotary regenerators, and particularly to improvements in the seals which separate the hot and cold air or gas passages. The regenerator, as I use the term herein, is a heat exchange device which has normally a moving porous matrix disposed partly for flow through the matrix of a gas to be heated and partly for flow of a hot gas which releases heat. There are variant forms in which the matrix is stationary and the structure which demarks the two flow paths moves, but these are the same in principle.

Regenerators of the type to which my invention is particularly directed are described in U.S. patent applications S.N. 559,390, now Patent No. 3,057,604 granted October 9, 1962, and S.N. 559,475, filed January 16, 1956, now forfeited, of common ownership with this application, and in U.S. Patent No. 2,888,248. These disclose a regenerator of the radial-flow or drum type provided with two stationary main seals which encircle the matrix. The regenerator transfers heat from the exhaust gas of a turbine engine to the compressed air which is to be heated by combustion and fed to the turbine. Particularly in the application to a turbine, there is a large difference in pressure between the compressed air at one side of the main seal and the turbine exhaust gas at the other. A leakage of compressed air to the exhaust resulting from this high pressure difference and permitted by any clearance or looseness of the main seal very seriously compromises the performance and efficiency of the engine. In a particular case, leakage of one percent of the compressed air results in the same order of loss in engine performance as a one percent decrease in regenerator effectiveness.

The primary difficulty in providing a seal of very close clearance and therefore minimum leakage arises from thermal distortion of the matrix because of temperature differences across it. The result is that a seal which is a close fit under one condition of engine operation may be loose in some areas and create a destructive rubbing contact in other areas when operating conditions change.

One approach to improving the seal is represented by Bubniak et al. Patent No. 2,888,248, in which relative thermal expansion of parts of the seal causes it to lessen its clearance as the engine heats up to normal operating temperature. This is highly beneficial, but the solution is not entirely complete. The Bubniak et al. seal must be designed to provide minimum clearance at the most critical engine operating condition with respect to seal clearance. Therefore, at other operating conditions, there will be substantial clearance, although much less than in previous uncompensated seals.

By way of a general introduction to the nature of my invention, the principle involved is based upon the discovery that the main seal may be made rigid and may be so constructed that its distortion is very nearly the same as that of the matrix. While some slight differences remain, the contour or cross-section of the seal is the same to a first order of approximation as that of the matrix under all engine operating conditions. The result, therefore, is improvement in engine efficiency and output over the entire range of operation from idle to full power rather than a great improvement at a selected operating point with progressive deterioration as this point is departed from.

The nature of the invention and the advantages thereof will be more clearly apparent to those skilled in the art from the succeeding detailed description of the preferred embodiment of the invention and the accompanying drawings.

FIGURE 1 is a schematic view of a drum regenerator of the type described in the patents referred to above.

FIGURES 2, 3 and 4 are schematic cross-sectional views illustrating the thermal distoration of regenerator matrices, the magnitude of the distortion being greatly exaggerated for clarity of illustration.

FIGURE 2 illustrates a drum or radial-flow matrix in which the inner surface is the hotter.

FIGURE 3 illustrates a drum matrix in which the outer surface is the hotter.

FIGURE 4 illustrates an axial-flow or disk matrix.

FIGURE 5 is a schematic cross-sectional view of a drum matrix and main seal therefor illustrating certain dimensional factors.

FIGURE 6 is a view similar to FIGURE 5 illustrating the thermal distortion of the matrix and seal, the distortion being greatly exaggerated.

FIGURE 7 is a partial side elevation view of a main seal.

FIGURE 8 is an end elevation view of the main seal.

FIGURE 9 is a fragmentary sectional view taken on the plane indicated by the line 9—9 in FIGURE 8.

Referring first to FIGURE 1 to clarify the exemplary regenerator structure, the regenerator comprises a slowly rotating annular cylindrical matrix 10, the supports, moving means, and rim seals for which are not illustrated. Compressed air flows inwardly through the portion of the matrix at one side of a bulkhead or diaphragm 11 and hot turbine exhaust gases flow outwardly through the remainder of the matrix. Where the matrix passes through the bulkhead 11 main seals 12 are provided, which closely surround the cross-section of the matrix at these points. As indicated more specifically in FIGURE 5, the matrix 10 may comprise two end rings 13 between which is mounted a permeable cylinder of heat transfer material 14 made up of metallic elements such as parallel plates or plates and wire screen. The matrix may, if desired, be as described in U.S. Patent No. 2,937,010. Its contour may be determined by radial partitions. The details of the matrix are not significant, since matrices of various structures exhibit the thermal distortion characteristic which gives rise to the sealing problem referred to above.

FIGURE 2 illustrates a drum matrix in which the direction of increasing metal temperature is from the outer to the inner surface as indicated by the arrow, which is the case with the arrangement illustrated in FIGURE 1. It will be seen that the matrix adopts a sort of spool shape. The inner and outer boundaries of the section correspond closely to circular arcs. This distortion is, of course, due to the greater expansion of the hot inner part of the matrix than the relatively cool outer part. The temperature difference across the matrix in a gas turbine installation may be something like 900° F.

FIGURE 3 is similar to FIGURE 2 except that it illustrates the barrel or convex distortion which would occur with a hotter outer than inner surface in matrix 10', as indicated by the arrow. The same problem arises with axial flow or disk matrices in which the air and gas flow through the matrix parallel to its axis of rotation. In FIGURE 4, the matrix is indicated by the numeral 16 and comprises inner and outer rims or bands 17 and 18 and heat exchange material 19 between them. With the direction of increasing metal temperature from left to right, as indicated by the arrow, the right face will expand more than the left face, and the cross-section of the matrix becomes substantially a segment of an annulus as in FIGURES 2 and 3.

FIGURE 5, previously referred to for the description of the matrix, shows schematically a main seal 12 disposed around the matrix. As illustrated, the parts are cold and are rectangular. In FIGURE 6, the thermal distortion of this installation, which is that of FIGURE 1, is shown greatly exaggerated. The cross-section of the matrix is a section of a circular annulus and the main seal 12 preferably should adopt the same curvature at the interfaces 21 and 22 between the seal and the matrix so that the clearance between the seal and matrix at the gaps 21 and 22 will remain at a constant minimum operating clearance to avoid rubbing and also avoid overlarge clearances with the attendant leakage. The problem thus is to arrive at the desired result, which has been deemed impossible. I have discovered, however, that this desired result can be very closely approximated so as to produce a seal of operating characteristics much improved over those previously known. The result may be accomplished with very simple structure, provided certain conditions are observed. In passing, it may be mentioned that my main seal 12 could be a unitary rectangular ring except that it must be in at least two separable parts to provide for mounting it around the matrix.

A simple and suitable main seal structure meeting the requirements of practice is illustrated in FIGURES 7 to 9. The seal 12 is a rectangular frame comprising a radially outer seal bar 31 and a radially inner seal bar 32. These bars are generally rectangular, except that the inner surface of the outer bar has a cylindrical concavity 33 and the outer surface of the inner bar has a cylindrical convexity 34, these according to the inner and outer radii of the matrix about its axis of rotation. The bars 31 and 32 are rigidly joined together at both ends by structure which may comprise a generally rectangular block or post 36, the ends of which engage flat surfaces at the ends of the bars 31 and 32. The bars 31 and 32 are rigidly fixed to the block 36 by four socket-head cap screws 38 extending through holes in the bars and into tapped holes in the block. The bars 31 and 32 cooperate directly with the outer and inner surfaces of the matrix. Sealing between the rim 13 of the matrix and the block 36 may, if desired, be facilitated by providing some clearance between these and fitting a floating sintered metal seal block 39, which is mounted in a radially extending slot 41 in the block 36. A leaf spring 42 may be mounted in the recesses 41 to bias the seal block 39 against the matrix. The other end of the seal may be the same as that shown. The edges or rims of the matrix are short, and have no significant departure from linearity.

No attempt is made to illustrate structure for supporting and guiding the main seal or sealing between it and the diaphragm or bulkhead. These arrangements may be of any suitable nature, preferably such as are illustrated in the applications and patent referred to above.

It will be seen that the main seal frame is a very simple and rigid structure. In order to cause it to adopt the same radii of curvature as the outer and inner faces of the matrix, the material of the bars 31 and 32, or, if desired, of the entire frame, must have a coefficient of thermal expansion properly related to that of the plates or other bodies the thermal expansion of which determines the distortion of the matrix. Referring to FIGURE 5, the thickness of the matrix in the direction of gas flow is indicated as T. The distance between the centers or axes of the outer and inner bars of the seal frame is indicated as D. The temperature differential between the seal bars 31 and 32 is somewhat less than the temperature differential across the matrix. The ratio of these two differentials will vary with the structure, but can be determined experimentally. As a first order of approximation, this will ordinarily be in the range from 80% to 90%. The curvature of the matrix is proportional to the temperature difference across the matrix times the thermal coefficient of expansion of the matrix and is inversely proportional to the thickness T. The curvature of the seal frame similarly is proportional to the temperature difference between the hotter and cooler bars times the thermal coefficient of expansion of the bars, and is inversely proportional to the distance D.

Thus, if the ratio of coefficients of thermal expansion of the seal bars and matrix is equal to D divided by T, the curvature will be the same to a rough order of approximation.

This agreement in distortion can be readily and significantly improved to a worth-while degree by the inclusion of a further factor which may be represented by Q, the ratio of the temperature differential between the bars to the temperature differential across the matrix. This gives the result that the desired ratio of thermal coefficients of seal and matrix equals D divided by the product of T and Q. By allowing for these two factors, a very close correspondence can be obtained between the distortions of the matrix and seal. There will be some slight deviations due to changing conditions, and particularly to the difference in rapidity of response to transients of the various parts, but these are essentially second order effects. Thus, by a simple computation and proper selection of materials, it becomes possible to provide a seal frame which has substantially the same distortion as the matrix.

The procedure for selecting materials may be illustrated by an example in which, following the symbology of the preceding paragraphs, T equals 2.00″, D equals 2.25″, and Q equals 0.71. In other words, the temperature difference between the seal bars 31 and 32 is 71 percent of the difference in temperature between the surfaces of the regenerator because of flow of heat through the blocks 36 and heat losses from the seal bars to the surrounding structure by radiation and conduction. Letting $A_s$ represent the average coefficient of thermal expansion of the seal material at its operating temperature and $A_r$ represent the average coefficient of thermal expansion of the regenerator material at its operating temperature, the value of $A_s$ can be found from the following:

$$A_s = \frac{D \times A_r}{T \times Q} = \frac{2.25 \times A_r}{2.00 \times 0.71}$$

If we assume the regenerator is made of a 400 series stainless material ($A_r = 6 \times 10^{-6}$ in./in. ° F.) then the seal material must have a coefficient of $9.5 \times 10^{-6}$, which would indicate that a 300 series steel would perform satisfactorily.

In cases where no single material provides a satisfactory match, the seal bars 31 and 32 may be made of different materials with the individual coefficients of expansion selected to satisfy the following identity:

$$\frac{(T_1 - 70°) A_1 - (T_2 - 70°) A_2}{D} = \frac{A_r \Delta T_r}{T}$$

in which D and T are as before, $T_1$ and $T_2$ are respectively the temperatures of the hotter and cooler seal bars, $\Delta T_r$ is the temperature difference across the regenerator, and $A_1$, $A_2$ and $A_r$ are the coefficients of expansion of the hotter seal bar, the cooler seal bar, and the matrix, respectively. The 70° is to correct for room temperature.

It should be understood that the amount of distortion of the matrix is not great, but the amount of leakage which may result from it may be quite serious. In an engine of the type referred to in the applications and patent cited above, the radius of the curvature of the matrix (radius of the arcs at 21 and 22 in FIGURE 6) has been computed and measured at from 200 to 300 inches during various conditions of engine operation.

It will be apparent that the same principles and structure of the seal for the radial flow matrix will be applicable to a seal for an axial flow matrix such as that illustrated in FIGURE 4.

The detailed description of the preferred embodiment of the invention for the purpose of explaining the principles thereof is not to be construed to limit or restrict the invention since many modifications may be made by the exercise of skill in the art within the scope of the invention.

I claim:

1. The combination of a rotary regenerator matrix having two opposite faces and providing for flow of gas from one said face to the other and a rigid seal extending around a cross-section of the matrix closely adjacent thereto, the seal including bars extending across the said faces, the ratio of the coefficients of thermal expansion of the bars and the matrix being approximately equal to the product of (1) the ratio of the distance between the central axes of the said bars to the thickness of the matrix between the said faces and (2) the ratio of the temperature differential across the matrix to the temperature differential between the said bars.

2. The combination of a rotary regenerator matrix having two opposite faces and providing for flow of gas from one said face to the other and a rigid seal extending around a cross-section of the matrix closely adjacent thereto, the seal including bars extending across the said faces, the materials of the seal bars and the matrix being chosen to satisfy substantially the identity $$\frac{(T_1-70°)A_1-(T_2-70°)A_2}{D}=\frac{A_r \Delta T_r}{T}$$

in which $T_1$ and $T_2$ are the Fahrenheit operating temperatures of the hotter and cooler seal bars, respectively; $\Delta T_r$ is the operating temperature differential across the matrix; $A_1$, $A_2$, and $A_r$ are the coefficients of thermal expansion of the hotter seal bar, the cooler seal bar, and the matrix, respectively; D is the distance between the axes of the seal bars; and T is the face-to-face thickness of the matrix.

References Cited by the Examiner

UNITED STATES PATENTS

| | | | |
|---|---|---|---|
| 2,747,843 | 5/56 | Cox et al. | 165—9 |
| 2,888,248 | 5/59 | Bubniak et al. | 165—9 |
| 2,937,039 | 5/60 | Santapa | 277—26 |
| 2,948,555 | 8/60 | Wright | 277—26 |
| 3,000,617 | 9/61 | Kikto | 60—39.51 |

CHARLES SUKALO, *Primary Examiner.*

HERBERT L. MARTIN, PERCY L. PATRICK,
*Examiners.*